Figure 1:
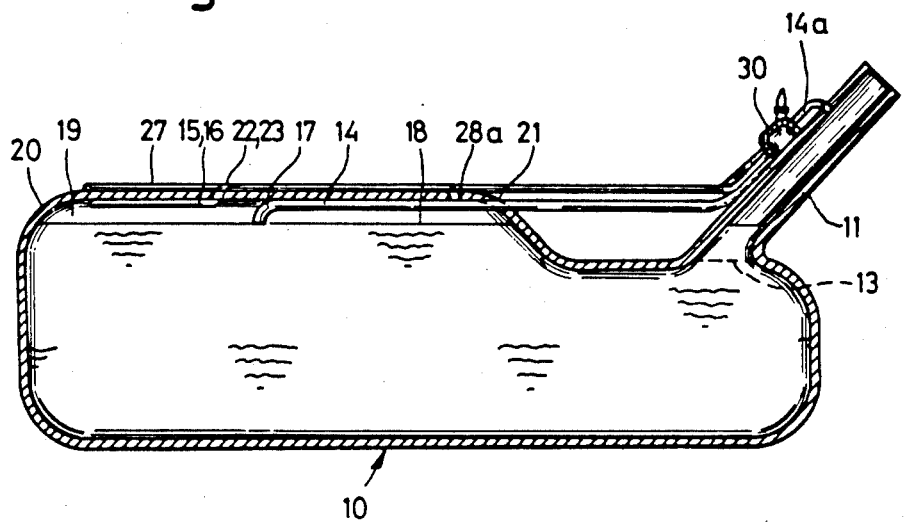

United States Patent [19]

Schmidt

[11] Patent Number: 4,739,808
[45] Date of Patent: * Apr. 26, 1988

[54] DEVICE FOR LIMITING FILLING AND FOR AIR ADMISSION TO AND DISCHARGE FROM TANKS, IN PARTICULAR FUEL TANKS FOR MOTOR VEHICLES

[75] Inventor: Wilfried Schmidt, Bingen, Fed. Rep. of Germany

[73] Assignee: General Motors Corporation, Detroit, Mich.

[ * ] Notice: The portion of the term of this patent subsequent to Dec. 2, 2003 has been disclaimed.

[21] Appl. No.: 897,609
[22] PCT Filed: Oct. 28, 1985
[86] PCT No.: PCT/EP85/00570
  § 371 Date: Jul. 16, 1986
  § 102(e) Date: Jul. 16, 1986
[87] PCT Pub. No.: WO86/02888
  PCT Pub. Date: May 22, 1986

[30] Foreign Application Priority Data

Nov. 17, 1984 [DE] Fed. Rep. of Germany ....... 3442149

[51] Int. Cl.$^4$ .............................................. B67C 3/02
[52] U.S. Cl. ..................... 141/286; 141/309; 141/302; 141/326; 220/86 R; 251/320
[58] Field of Search ..................... 141/37-66, 141/1-12, 285-310, 325-327; 251/149.2, 320; 220/86 R; 137/527, 855

[56] References Cited

U.S. PATENT DOCUMENTS 4,625,777 12/1986 Schmidt ............................ 141/302

Primary Examiner—Houston S. Bell, Jr.
Attorney, Agent, or Firm—Donald F. Scherer

[57] ABSTRACT

A device for limiting filling and for air admission to and discharge from tanks, in particular fuel tanks of motor vehicles, part of the tank volume being used as a pressure equalizing chamber (19) with regard to temperature fluctuations, has an air inlet and outlet device which opens out into the ventilatable filler neck (11, 110) and which comprises filling evacuation tubes (14) which determines the maximum liquid level (18) still regarded as permissible, and operating evacuation tubes (15, 16) with a closure device, which takes over air admission to and discharge from the pressure equalizing chamber (19), such that when the tank cap is removed, the operating evacuation tubes is closed by spring action (42, 133) and when the tank cap is on, it is opened by the cap itself against spring force.

To control the operating evacuation tubes (15, 16) there is used a valve (35, 35a, 123) which is incorporated in the air inlet and outlet pipes (14, 15, 16, 27) and whose valve body (39, 127) can be operated by a piston stem (40, 128) against spring resistance (42, 133). The valve (35, 35a, 123) is disposed in the filler neck (11, 110) in such a way that the piston stem (40, 128) comes to lie parallel or essentially parallel to the wall of the filler neck (11, 110) within same and protrudes out of the filler neck by its free end when the tank cap is raised.

20 Claims, 3 Drawing Sheets

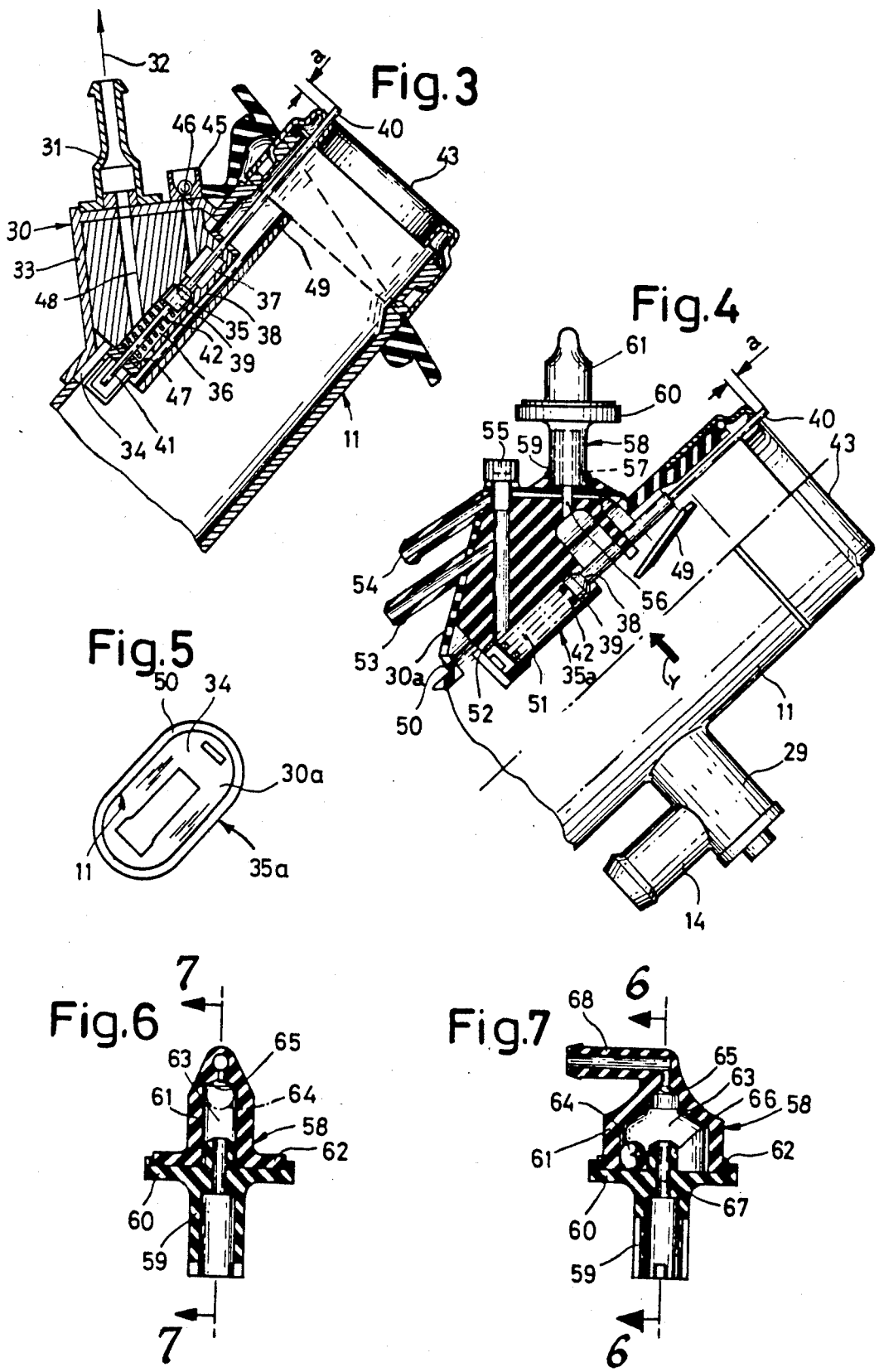

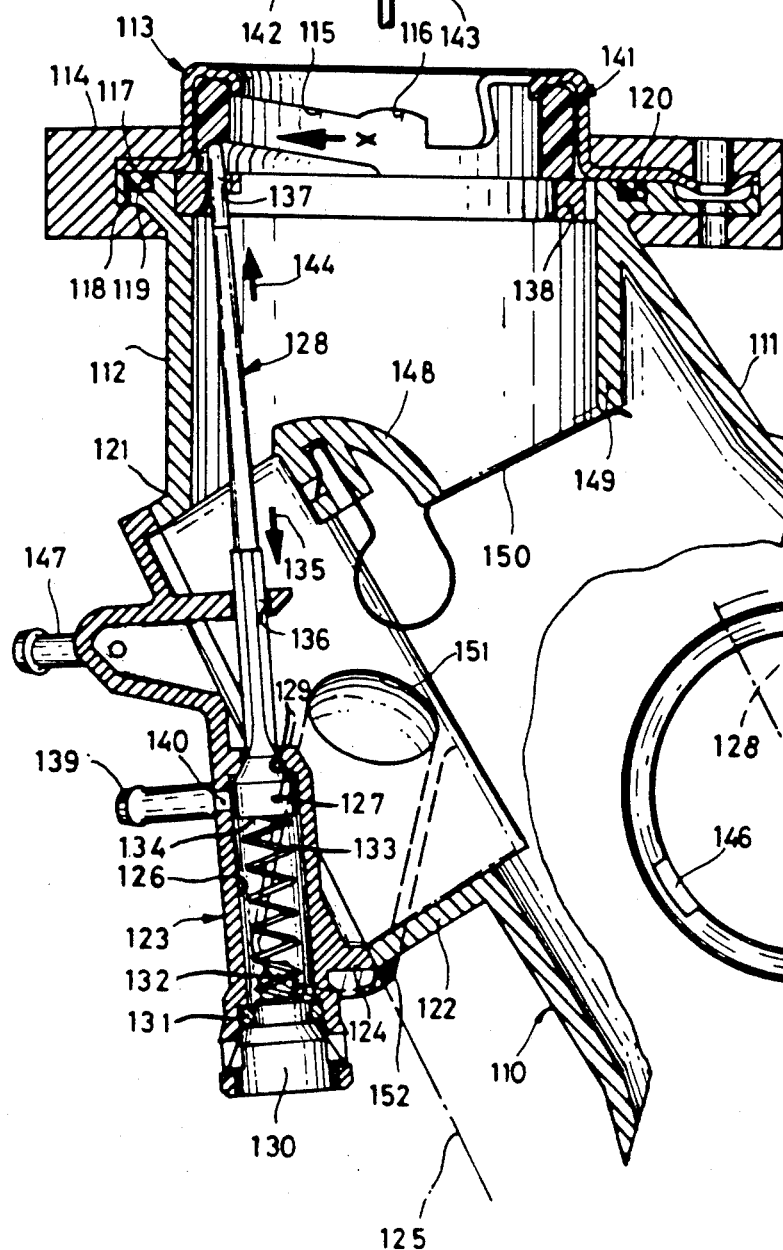

DEVICE FOR LIMITING FILLING AND FOR AIR ADMISSION TO AND DISCHARGE FROM TANKS, IN PARTICULAR FUEL TANKS FOR MOTOR VEHICLES

The invention relates to a device for limiting filling and for air admission to and discharge from tanks, in particular fuel tanks for motor vehicles, part of the tank volume being used as a pressure equalising chamber with regard to temperature fluctuations, with an air inlet and outlet device which opens out into ventilatable filler neck and which comprises filling evacuation means which determines the maximum liquid level still regarded as permissible, and operating evacuation means with a closure device, which takes over air admission to and discharge from the pressure equalising chamber, such that when the tank cap is removed, the operating evacuation means is closed by spring action, and when the tank cap is on, it is opened by the cap itself against spring force. The tank cap is preferably constructed in accordance with those described in U.S. Pat. Nos. 4,168,011 Lomer and 3,703,245 Brewer. A cap, such as that shown in U.S. Pat. No. 4,142,648 Johnson et al. may be incorporated if a threaded filler neck is used on the fuel tank.

The invention thus works from the assumption that it is structurally possible to put the operating evacuation means out of action during refuelling. The maximum permissible fuel level in the fuel tank is determined exclusively by the filling evacuation means during refuelling. In this way, overfilling of the fuel tank is avoided; on the contrary, a well-defined space is kept free in the fuel tank, which can take up the extra volume during subsequent expansion of the fuel. Escape of fuel through the air outlet pipe at high ambient temperatures with corresponding heating and increase in volume of the fuel can thus be prevented effectively.

With regard to the state of the art described above, reference is made to U.S. Pat. No. 37 28 846 and German Pat. No. 27 52 645.

It is the object of the invention to achieve still more effective and reliable limiting of the filling during refuelling, by simple means.

According to the invention, the problem is solved by the fact that there is used to control the operating evacuation means, a valve which is incorporated in the air inlet and outlet pipes and whose valve body can be operated by a piston stem against spring resistance, and the valve is disposed in the filler neck in such a way that the piston stem comes to lie parallel or essentially parallel to the wall of the filler neck within same and protrudes out of the filler neck by its free end when the tank cap is raised.

The invention has the advantage that overfilling of the tank is reliably prevented. As it is possible to make all components—apart from the piston stem itself—out of plastic, the device according to the invention can be manufactured easily and with cost savings. Another advantage of the invention lies in that calibration of the overflow pipe can be dispensed with. The localised constriction of the overflow pipe of approx. 1–1.5 mm, which is normal in the state of the art known at present, has the disadvantage that for one thing, air escapes from the tank too quickly, with the consequence of a risk of overfilling. Secondly, the constricted point can easily become clogged, which results in corrosion of the tank. Finally, in case of extreme heating the gas in the tank cannot escape quickly enough. This leads to disadvantageous permanent deformation of the fuel tank.

All these disadvantages, which arise in known devices of the kind in question, are effectively avoided by the present invention.

In an advantageous development of the basic concept of the invention, it is proposed to dispose the valve in a valve housing which is attached to the side of the filler neck comprising a corresponding recess, at the upper end thereof, in such a way that the valve with its piston stem comes to lie within the filler neck as close as possible to the inner wall thereof. In this way, the valve does not form an obstruction to the petrol pump nozzle, which is introduced into the filler neck during refuelling.

According to one embodiment which is highly advantageous in the above sense, the upper end of the filler neck is bent at an angle to the lower portion of the filler neck adjoining the tank, in the direction of a horizontal plane, and the piston stem of the valve is arranged parallel or essentially parallel to the top region of the wall of the angled end of the filler neck. Advantageously, the valve is disposed in the upper region of the filler neck, immediately before the bend thereof.

The advantage of the above characteristics lies in that a maximum possible structural clearance is provided in the region surrounding the filler neck, without thereby endangering or impairing the mode of operation of the device specified hereinbefore. Thus it is possible to apply the above basic concept of the invention to tanks whose filler necks cannot be designed rectilinearly for structural reasons.

To protect the valve against possible damage by the petrol pump nozzle, it is proposed to shield the valve by a protective wall from the interior of the filler neck which receives the petrol pump nozzle during refuelling.

In another advantageous development of the invention, the valve has two chambers, of which a first chamber communicates on the one hand by a bore with the interior of the filler neck, and on the other hand by a pipe with the surrounding atmosphere, and a second chamber which can be sealed off from the interior of the filler neck by the valve body is connected by a channel to the operating evacuation means which comes from the tank and opens out into the valve housing.

The pipe connecting the first chamber to the atmosphere can open out either directly into the surrounding atmosphere or, preferably, into an activated carbon tank for control of fuel evaporation. By the latter variant, at the same time allowance is made advantageously for the regulations on fuel evaporation control, which are expected for 1986.

The concept according to the invention, of the device for limiting filling and for air admission to and discharge from tanks, permits a preferred embodiment which is distinguished by the fact that a so-called roll-over valve known in the art is integrated in the valve housing.

A roll-over valve of this kind has become known in the art e.g. from German Offenlegungsschrift No. 28 48 546. In case of extreme inclined or upside-down positions of the vehicle—perhaps after an accident—it prevents escape of fuel from the fuel tank and thus counteracts a possible risk of fire. In the previous state of the art, the roll-over valve always constituted a separate device, independent of the device for limiting filling or the device for air admission to and discharge from the fuel tank. Due to the present invention, for the first time there has been success in manufacturing and using these two important units in the form of an integrated component.

In a further development of the present invention, for a tank, in particular fuel tank, in which a so-called bayonet socket is disposed at the top end of the filler neck for receiving and holding the tank cap in sealing relationship, it is proposed that the bayonet socket axially overlaps the end of the piston stem protruding out of the filler neck and covers it on the outside, and in the bayonet socket is rotatably mounted an end-face seal which comprises in its rear face a recess with an inclined surface which is operatively connected to the end of the valve piston stem, and the end-face seal can be operated by the tank cap when it is screwed onto or unscrewed from the bayonet socket.

The advantage of this concept lies in that the valve piston stem is no longer operated directly by the tank cap, but, on the contrary, indirectly via an additional component, namely an end-face seal which is structurally associated with the filler neck. In this case the piston stem is better protected from damage, by the bayonet socket axially overlapping and covering its end, than with direct operation by the tank cap.

Normally, a tank cap which can be screwed onto a bayonet socket has spring lugs which cooperate with inclined surfaces and latching recesses in the bayonet socket. In an advantageous development of the invention, these structural conditions are adopted to the effect that the end-face seal comprises recesses for engagement of the spring lugs, such that during rotation of the tank cap, it can be rotated by the latter by means of the spring lugs.

To protect the valve including piston stem effectively from possible damage by the petrol pump nozzle which is introduced into the filler neck, it is furthermore proposed to form, at the bend between the upper and lower portions of the filler neck, inside the latter, a funnel which can preferably be closed off by a spring steel flap and whose upper region then serves as the protective wall providing a shield from the interior of the filler neck which receives the petrol pump nozzle during refuelling.

Advantageously, the funnel with spring steel flap, which is required in the filler neck in any case if lead-free fuel is used, can be used for this.

The invention is now illustrated with reference to practical examples in the drawings, and explained in more detail below.

Figure 2:
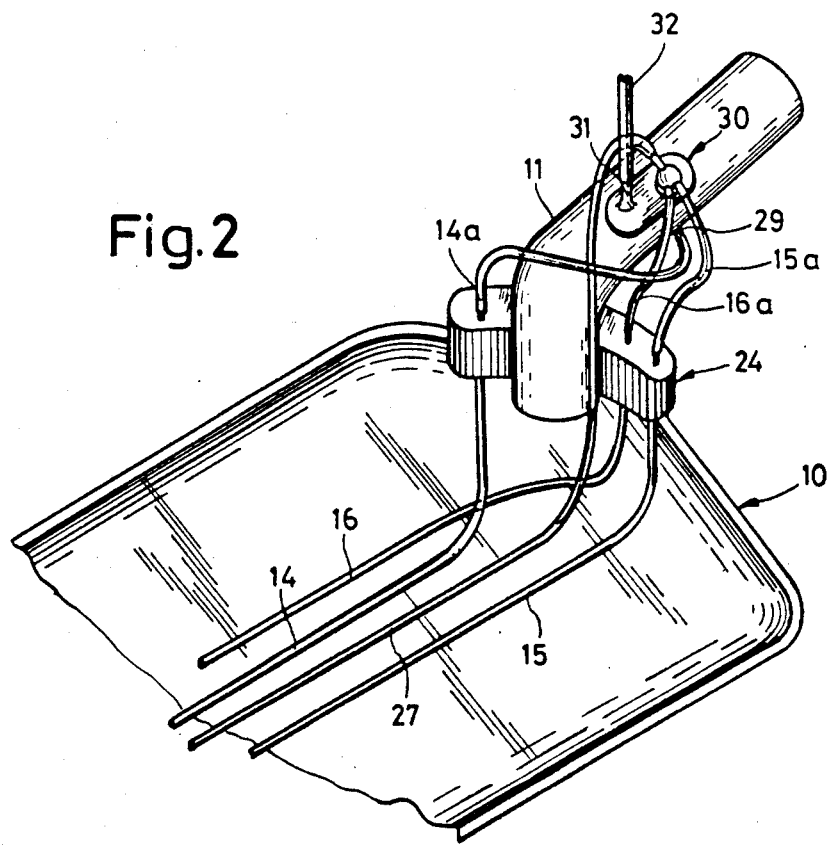

FIG. 1 shows a fuel tank for a motor vehicle, with various air outlet pipes (schematically), FIG. 2 shows, also schematically, the paths of the air outlet pipes in the region of the filler neck of a fuel tank according to FIG. 1, FIG. 3 shows an embodiment of a device for air admission to and discharge from a fuel tank, with reference to a longitudinal section through the upper portion of the filler neck, FIG. 4 shows another embodiment of a device for air admission to and discharge from a fuel tank, in a view according to FIG. 3, in partial section, FIG. 5 shows the subject of FIG. 4, as seen in the direction of arrow Y, FIG. 6 shows a vertical section (section VI—VI in FIG. 7) through a roll-over valve according to FIG. 4, in an enlarged view compared with FIG. 4, FIG. 7 shows a section along line VII—VII in FIG. 6, FIG. 8 shows a longitudinal section through the upper portion of a filler neck of a fuel tank for motor vehicles (tank cap omitted), FIG. 9 shows an end-face seal according to FIG. 8, in a separate view, as seen in the direction of arrow X, and FIG. 10 shows the end-face seal according to FIG. 9, in plan view.

According to FIG. 1, 10 indicates a fuel tank of a motor vehicle, e.g. a passenger car. The fuel tank 10 is of relatively flat construction, and comprises an upwardly projecting filler neck 11 which is shown only schematically in FIG. 1. The filler neck 11 can be closed in the usual manner by a cap (not shown) with air inlet and outlet opening. First, the filler neck 11 itself essentially serves as the means for limiting filling of the fuel tank 10, i.e. during refuelling of the fuel tank. As soon as the liquid level has reached the lower end of the filler neck 11, which is marked 13, air can be discharged from the fuel tank 10 only by an air inlet and outlet device which consists of a first air inlet and outlet pipe 14, and three air outlet pipes (15, 16, 27) forming a second air outlet system (so-called operating evacuation means). The basic evacuation function (filling evacuation) is now taken over first of all by the pipe 14, whose end 17 located inside the fuel tank 10 is bent downwards approximately at a right angle, as shown by FIG. 1. The cross-section of the filling evacuation pipe 14 is dimensioned so that the air displaced from the fuel tank 10 by the liquid during filling can escape through this pipe 14 unobstructed. This filling process, which proceeds practically without delays, continues until the liquid level has reached the end 17 of the filling evacuation pipe 14. This liquid level is marked 18 in FIG. 1.

The fuel tank 10 is not to be filled up further beyond the liquid level 18. Thus there remains free a residual space which serves as a pressure equalising chamber, i.e. to take up any extra volume as a result of fuel expansion due to temperature. The volume of this residual space 19, as a rule approximately 5 liters, is therefore determined by the filling evacuation pipe 14 or the downwardly bent end 17 thereof. The fuel tank 10 is also ventilated through the filling evacuation pipe 14 when fuel is consumed during operation of the vehicle, in order not to allow formation of a vacuum, with the risk of an implosion.

The requirement of evacuation of air from the fuel tank 10 does not, however, exist only until the maximum filling liquid level 18 is reached; on the contrary, provision must also be made for sufficient evacuation of air from the residual space 19 acting as the pressure equalising chamber. For the fact is that in the pressure equalising chamber 19 is formed, from air and fuel vapours, a gas mixture whose pressure can increase to considerable values when ambient temperatures are correspondingly high. To avoid such pressure increases, a second air outet pipe system is provided (so-called operating evacuation means) which, inter alia, consists of the pipes 15, 16 and 27 already mentioned. The outwardly bent ends of the two air outlet pipes 15, 16 (cf. FIG. 2 for this) are located directly beneath the upper boundary wall 20 of the fuel tank 10. The third air outlet pipe 27 communicates with the interior of the fuel tank at point 28a approximately in the middle of the upper boundary wall 20. By this means, satisfactory evacuation of air from the pressure equalising chamber 19 is also ensured in case of possible slight tilting of the vehicle and dynamic forces.

As can also be seen from FIG. 1, the filling evacuation pipe 14 extends in a horizontal direction first within the fuel tank 10, then at point 21 passes through the upper boundary wall 20 of the fuel tank 10 to the outside, then extends further horizontally, and finally leads into an evacuation tank marked 24, which can be seen in FIG. 2 and comprises three chambers. The two operating evacuation pipes 15 and 16 also lead, as shown by FIG. 2, each into a chamber of the evacuation tank 24. The filling evacuation pipe 14 then continues into a pipe section 14a which emerges from the evacuation tank 24 and finally leads into the upper region of the filler neck 11 at 29.

Corresponding extensions 15a and 16a respectively of the operating evacuation pipes 15, 16 likewise emerge from the evacuation tank 24, but do not lead directly into the filler neck 11, but instead into a valve marked 30 as a whole. The third operating evacuation pipe 27 likewise leads into the valve 30, bypassing the evacuation tank 24. An integral part of the whole valve 30 is a so-called roll-over valve 31, from which an air outlet pipe 32 leads to an activated carbon tank (not shown). The construction and mode of operation of the roll-over valve 31 can be seen in detail in FIGS. 6 and 7.

One embodiment of the valve 30 and the mode of operation thereof can be seen in FIG. 3. The valve 30 is enclosed by a valve housing 33 which is attached to the side of the filler neck 11 in the region of a recess 34 in the filler neck 11, sealing this recess in the process. An essential part of the whole valve 30 is a piston valve 35 with two chambers 36 and 37. At 38 is formed a conical valve seat which coacts with a correspondingly conical valve body 39. On both sides of the valve body 39 the latter continues into two piston stems 40 and 41 of reduced diameter. Inside the first chamber 36, surrounding the piston stem 41, is disposed a helical compression spring 42 which biasses the valve body 39 into the valve seat 38 and hence into the closed position of the valve 35. The second piston stem 40, shown on the right in FIG. 3, serves to actuate the valve body 39 against the force of the compression spring 42. For this purpose the piston stem 40 has a length such that it projects by quantity a beyond the end 43 of the filler neck 11. If the tank cap, which is not shown in FIG. 3, is now placed on the filler neck and screwed onto it, at the same time the piston stem 40 is accordingly displaced to the left, and the valve body 39 lifts off the valve seat 38. The valve 35 is then open. When the valve 35 is open, the two chambers 36, 37 are directly connected to each other.

To allow operation of the valve body 39 or piston stem 40 by the tank cap, the tank cap has a seal which, when the tank cap is screwed on, does not turn with it. The piston stem 40 is then operated by the seal of the tank cap. The cap may be constructed in accordance with those described in U.S. Pat. Nos. 4,168,011 Lomer and 3,703,245 Brewer. A cap, such as that shown in U.S. Pat. No. 4,142,648 Johnson et al. may be incorporated if a threaded filler neck is used on the fuel tank.

The valve housing 33 which can be seen in FIG. 3 furthermore has a pipe connection 45 to which can be connected one of the three operating evacuation pipes 15, 16 or 27 shown in FIGS. 1 and 2. Two more connections of this kind have been left out of FIG. 3 for simplicity's sake. Inside the valve housing 33, a connecting channel 46 leads from the connection 45 to the second valve chamber 37. When the valve 35 is closed (see FIG. 3), operating evacuation of the fuel tank 10 is therefore not possible. This condition is present when the filler neck 11 is open, i.e. during the refuelling process. After the end of the refuelling process, the cap is screwed onto the filler neck 11, thus opening the valve 35, and operating evacuation, i.e. discharge of air from the reserve space 19 (FIG. 1), can now take place.

When the filler neck 11 is open, on the other hand, evacuation of the fuel tank 10 is confined to filling evacuation only. For this purpose the first valve chamber 36 communicates by a bore 47 with the interior of the filler neck 11. The gases conducted through the filling evacuation pipe 14 or 14a (cf. FIG. 2) into the filler neck 11 can thus pass through the bore 47 into the first valve chamber 36, and from there through a connecting channel 48 into the pipe 32 leading to the activated carbon tank.

FIG. 3 furthermore makes it clear that the valve 35 is arranged directly adjacent to the inner wall of the filler neck 11 and parallel thereto, in order to obstruct the refuelling process as little as possible. In order to avoid damage to the valve 35 by the petrol pump nozzle extending into the filler neck, a protective wall 49 is provided.

The valve housing 30 can be made altogether out of synthetic material, and designed as an injection moulding. This allows particularly easy and cost-saving manufacture of the whole valve 35, as all the pipe connections (e.g. 45), channels (e.g. 46, 48) and valve chambers 36, 37, including valve seat 38, can be made at the same time as manufacture of the valve housing 30 in a single operation and without subsequent processing.

If the filler neck 11 is also made of a corresponding synthetic material, the plastic valve housing 30 can advantageously be welded to the filler neck 11. A corresponding embodiment is shown by FIG. 4. The welded joint between the valve housing, which is marked 30a there, and the filler neck 11, is marked 50. An essential difference from the embodiment according to FIG. 3 lies in that the valve 35a has only a single chamber, which is marked 51. The other component parts of the valve 35a correspond to the embodiment according to FIG. 4, and are provided with corresponding references. FIG. 4 furthermore shows that the valve chamber 51 is connected by a first channel 52 to two pipe connections 53, 54 into each of which leads an air inlet and outlet pipe of the operating evacuation means (not shown). These may be e.g. the pipes which can be seen in FIG. 2 and are marked 15, 16 or 15a, 16a there. A third connection for a third air inlet and outlet pipe (as can be seen e.g. in FIG. 2 and is marked 27), is not provided directly in the embodiment according to FIG. 4. Instead, the channel 52 is closed sealingly at its upper end by a screw 55. Instead of the screw 55, however, there may be fitted a mounting with a third pipe connection for a third air inlet and outlet pipe (e.g. 27, FIG. 2).

For filling evacuation there is used—according to the embodiment as in FIG. 2—an air inlet and outlet pipe 14 leading into the filler neck 11 at 29. From the inside of the filler neck 11, the gases accumulating during refuelling pass into a second channel 56 of the valve housing 30a. The upper extension of the second channel 56 forms a pipe connection 57 onto which is fitted a roll-over valve marked 58 as a whole (cf. also FIGS. 6 and 7). The roll-over valve 58 is advantageously made of the same synthetic material as the valve housing 30a and therefore, like the latter, can also be made by injection moulding. Moreover, the use of two materials of the same kind for valve housing 30a on the one hand, and roll-over valve 58 on the other hand, makes it possible to weld the roll-over valve 58 directly onto the valve housing 30a.

In the embodiment according to FIGS. 4–7, on the other hand, the roll-over valve 58 is, as stated, fitted onto the pipe connection 57. For this purpose the roll-over valve 58 is made in two parts, namely, firstly a lower sleeve-like extension 59 with flange 60, and secondly an upper housing portion 61. The upper housing portion 61 also has a flange—marked 62—which abuts against the flange 60 of the lower sleeve portion 59 (cf. in particular FIG. 6). The two flanges 62 and 60, and hence also the two portions 59, 61 of the roll-over valve 58, are advantageously glued or welded together.

Inside the upper portion 61 of the roll-over valve 58 is formed an elongate valve chamber 63 in which is disposed a ball valve 64. The valve chamber 63 tapers conically upwards towards a valve seat 65. In FIG. 6 the ball valve 64 is shown in dot-dash lines in position on the valve seat 65. On the lower portion 59 of the roll-over valve 58 is formed a pin 66 which extends into the valve chamber 63 and prevents closure of the through-pipe 67 by the ball valve 64 in the normal position of the vehicle. The closed position of the roll-over valve, which is shown in dot-dash lines in FIG. 6 and in which the ball valve 64 is located on the valve seat 65, comes about only when the vehicle adopts an extremely tilted or upside-down position, a condition which may arise e.g. after an accident. Normally, therefore, the roll-over valve 58 is permanently open (cf. FIG. 7).

At the upper end of the upper portion 61 of the roll-over valve 58 is integrally formed a pipe connection 68, as shown by FIG. 7. Here, an air inlet and outlet pipe (not shown) may be connected, which conducts the gases accumulating inside the filler neck 11 or fuel tank 10, away to the ambient atmosphere, preferably via an activated carbon tank (not shown).

In other respects, the valve 35a to be seen in FIGS. 4 and 5 operates as follows. During refuelling, i.e. when the tank cap is removed, the piston stem 40 protrudes by amount a out of the filler neck 11. The valve body 39 is biassed by the pretensioned compression spring 42 into the valve seat 38, and the valve 35a is thus closed. In this position of the valve 35a, only filling evacuation can take place (cf. the above statements in this respect). After the end of the refuelling process, the filler neck 11 is now closed by the tank cap (not shown). At the same time the seal of the tank cap operates the piston stem 40, i.e. the valve body 39 is lifted off the valve seat 38, and the valve 35a is opened. In this open valve position, there is now a direct connection between the channel 52 and the interior of the filler neck 11. The air inlet and outlet pipes of the operating evacuation means, which are connected to the valve housing 30a at 53, 54, can now transport the gases which have accumulated in the pressure equalising chamber 19 of the fuel tank 10 (cf. FIG. 1) through the interior of the filler neck 11 into the second channel 56 of the valve housing 30a, and from there via the roll-over valve 58—and, if occasion arises, an activated carbon tank—into the ambient atmosphere.

The references used in FIGS. 8–10 and the statements below do not directly follow on in order from the sequence of references of FIGS. 1–7, but begin only with number "110."

According to FIGS. 8, 110 indicates as a whole a filler neck of a fuel tank for motor vehicles. The filler neck 110 consists of a lower portion 111 and an upper portion 112 integrally connected to the latter. The upper portion 112 is angled relative to the lower portion 111 in a direction towards a horizontal plane. On the upper end face of the filler neck 110, which forms the filler opening, is mounted a bayonet socket 113 by means of an injection-moulded joint 114. The bayonet socket 113 serves, in a known manner, to receive and hold sealingly a tank cap (not shown). For this purpose the bayonet socket 113 comprises inclined butting surfaces 115 which each pass into a latching recess 116. The inclined butting surfaces 115 and latching recesses 116 cooperate in a manner which is known and therefore not shown, with two diametrically opposed spring lugs on the tank cap, not shown. The bayonet socket 113 has a laterally outwardly bent flange 117 by which it abuts against the face of a flange 118 formed on the upper portion 112 of the filler neck 110. Sealing of this flange joint 117, 118 is provided by a rubber seal 119 constructed as an O-ring, which is disposed in a groove 120 in the face of the filler neck flange 118.

As can also be seen from FIG. 8, on the lower portion 111 of the filler neck 110—immediately beneath the bend 121—is formed in the upper region a connecting portion 122, on which is mounted a valve marked 123 as a whole. The valve 123 has for this purpose a valve cover 124 whose dimensions correspond to the dimensions of the connecting portion 122. The connecting portion 122 of the filler neck 110 and the valve 123 are joined together by welding. The welding plane is marked 125 here. The valve 123 forms part of an air inlet and outlet device, such as is the subject of FIGS. 1 and 2, to which reference can be made in this respect (cf. also description above). Inside the valve 123 is formed a cylindrical valve chamber 126, inside which is disposed axially movably the rear end of a valve piston stem marked 128 as a whole, which rear end is constructed as a valve body and marked 127. The valve body 127 cooperates with a valve seat 129 formed at the upper end of the valve chamber 126. The rear end of the valve chamber 126 is closed by a plug 130 and sealed by means of a rubber seal 131 constructed as an O-ring. On the plug 130 is formed a pin 132 which extends into the valve chamber 126 and which is surrounded by a compression spring 133. The compression spring 133 is pretensioned and supported by its upper end on the rear face 134 of the valve body 127. It biasses the valve body 127 into the closed position to be seen in FIG. 8. Opening of the valve 123, for which purpose the piston stem 128 must be moved in the direction of arrow 135, can therefore be performed only against the resistance of the compression spring 133.

As also shown in FIG. 8, the piston stem 128 is mounted at two additional points, marked 136 and 137. Mounting point 136 is in this case formed by part of the valve housing itself, whereas the second mounting point 137 is embodied by a ring 138 which is disposed at the upper end of the upper portion 112 of the filler neck.

The valve 123 serves to control the so-called operating evacuation pipe which, coming from the fuel tank (not shown), leads into a pipe connection 139 of the valve housing. The connecting bore between the pipe connection 139 and the valve chamber 126 is marked 140. As already explained above in connection with FIGS. 1–4, the operating evacuation means is operative only when the tank cap is screwed on. When the tank cap is unscrewed, however,—this condition is shown in FIG. 8—the valve body 127 is moved by the compression spring 133 into its closed position on the valve seat 129, and the operating evacuation means is blocked in this position. In order to set the operating evacuation means 139 in operation, therefore, as already indicated above, the valve 127, 129 must be opened, i.e. the piston stem 128 must be moved in the direction of arrow 135. To accomplish this, inside the bayonet socket 113 is rotatably mounted an end-face seal 141 (cf. FIGS. 9 and 10 in this respect too). As can be seen in particular from FIG. 9, the end-face seal 141 has in its rear face a recess 142 which is defined by an inclined surface 143. The recess 142 or inclined surface 143 extends in a circumferential direction—as shown by FIG. 10—through an angular range marked α. By means of the inclined surface 143, the end-face seal 141 cooperates with the upper end of the piston stem 128. On account of the structural conditions described, displacement of the piston stem 128 in an axial direction is effected by corresponding rotation of the end-face seal 141. Here, the pitch of the inclined surface 143 is designed in such a way that on clockwise rotation of the end-face seal 141, the piston stem 128 moves axially in the direction of arrow 135, i.e. in the direction of opening of the valve 123, 127, 129. On anticlockwise rotation of the end-face seal 141, on the other hand, axial movement of the piston stem 128 in the reverse direction, i.e. in the direction of arrow 144, is possible.

To operate the end-face seal 141 in the manner described above, there is used the tank cap which is not shown in the drawing, this being so while the cap is being screwed onto the bayonet socket 113 or unscrewed from it. For this purpose the end-face seal 141 has—as shown by FIG. 10—two diametrically opposed recesses 145, 146 which cooperate with the above-mentioned spring lugs of the tank cap. The end-face seal 141 is therefore set in rotation by the spring lugs of the tank cap. Therefore when the tank cap is screwed on clockwise, according to what has been said above, the end-face seal 141 is also turned clockwise and, as a result of this, the piston stem 128 is displaced in the direction of arrow 135. In this case the valve 123, 127, 129 opens, and the operating evacuation means 139 can become operative. Conversely, when the tank cap is unscrewed from the bayonet socket 113, the valve 123 (127, 129) is automatically closed again by the pretensioned compression spring 133, so that the operating evacuation means 139 remains blocked during filling up with fuel.

As also shown by FIG. 8, on the housing of the valve 123 is also formed an additional pipe connection which is marked 147. This is an additional component of the above-mentioned operating evacuation means. The connection 147 is here used for releasably securing a hose (not shown) which leads to an activated carbon tank (also not shown). Therefore while the above-mentioned pipe connection 139 serves to conduct the fuel and air vapours coming from the free space in the fuel tank, into the valve chamber 126, the pipe connection 147 provides for final release of this mixture from the filler neck 110 into the atmosphere, in which case it flows first through an activated carbon tank for purification, as stated. Between the pipe connection 147 and the activated carbon tank is advantageously mounted a so-called roll-over valve. A roll-over valve of this kind (cf. FIGS. 6 and 7 in this respect) advantageously prevents escape of fuel when the vehicle is tilted or upside-down (perhaps as a result of an accident). In other respects, reference is made to the above statements on FIGS. 6 and 7 with regard to this.

Finally, the connecting portion 122 of the filler neck 110 also comprises an opening 151 onto the outside of which is moulded an air outlet connecting piece 152. The air outlet connecting piece 152 forms the upper connection for an air outlet pipe (not shown) which starts from the fuel tank and determines the liquid level there. The opening 151 and air outlet connecting piece 152 therefore do not belong to the operating evacuation means described above and marked 139, 147 (controlled by the valve 123), but on the contrary constitute the so-called filling evacuation means. The mode of operation of this kind of filling evacuation means is described above in detail (cf. in particular the statements on FIGS. 1 and 2), so that discussions in more detail here are superfluous.

In FIG. 8 can be seen another special feature of the practical example shown in FIGS. 8–10. It consists in that inside the upper portion 112 of the filler neck, at the bend 121, is formed a funnel composed of walls 148, 149. The funnel 148, 149 can be closed by a spring steel flap 150. During refuelling, the spring steel flap 150 is depressed downwardly against its spring resistance by the petrol pump nozzle introduced into the funnel 148, 149. In this case, during the refuelling process the wall of the funnel 148, 149 advantageously also serves as a protective wall to protect the valve 123, 127, 129 or the piston stem 128 from possible damage by the petrol pump nozzle.

I claim:

1. Device for limiting filling and for air admission to and discharge from a fuel tank for motor vehicles, said fuel tank including a filler neck that is vented, part of the tank volume being used as a pressure equalising chamber with regard to temperature fluctuations, with an air inlet and outlet device including air inlet and outlet pipes which open out into said ventilatable filler neck and which comprises filling evacuation means which determines the maximum liquid level still regarded as permissible, and operating evacuation means including a tank cap for said neck, which takes over air admission to and discharge from the pressure equalising chamber, such that when said tank cap is removed, the operating evacuation means is closed by spring action, and when said tank cap is on, it is opened by said cap itself against spring force, characterised in that there is used to control the operating evacuation means, a valve (35, 35a; 123, 127, 129) which is incorporated in the air inlet and outlet pipes (15, 16, 27; 139, 147) having a valve body (39; 127) operated by a piston stem (40; 128) against spring resistance (42; 133), and said valve (35, 35a; 123, 127, 129), being disposed in the filler neck (11; 110) in such a way that said piston stem (40; 128) comes to lie parallel or essentially parallel to a wall of said filler neck within same and protrudes out of said filler neck by its free end when said tank cap (44) is raised.

2. Device according to claim 1,
characterised in that a valve (35, 35a; 123) is disposed in a valve housing (30 or 30a) which is attached to the side of the filler neck (11; 110) comprising a corresponding recess (34), at an upper end thereof, in such a way that the valve with its piston stem (40; 128) comes to lie within the filler neck as close as possible to an inner wall thereof.

3. Device according to claim 1,
characterised in that an upper end (112) of the filler neck (110) is bent at an angle to a lower portion (111) of the filler neck adjoining the tank, in the direction of a horizontal plane, and the piston stem (128) of the valve (123, 127, 129) is arranged parallel or essentially parallel to a top region of the wall of the angled upper end (112) of the filler neck (FIG. 8).

4. Device according to claim 3, characterised in that the valve (123, 127, 129) is disposed in the upper region of the filler neck (110), immediately before the bend (121) thereof.

5. Device according to claim 1, characterised in that the valve (35, 35a; 123, 127, 129) is shielded by a protective wall (49; 148) from the interior of the filler neck (11; 110) which receives a petrol pump nozzle during refuelling.

6. Device according to claim 1, characterised in that the valve (35) has two chambers (36, 37), of which a first chamber (36) communicates on the one hand by a bore (47) with the interior of the filler neck (11), and on the other hand by a pipe (48, 31, 32) with the surrounding atmosphere, and a second chamber (37) which can be sealed off from the interior of the filler neck (11) by said valve body (39) is connected by a channel (46) to the operating evacuation means which comes from the tank (e.g. 10 in FIG. 1 or 2) and opens out into a valve housing (30) (FIG. 3).

7. Device according to claim 6, characterised in that the pipe (46, 31, 32; 147) connecting the first chamber (36) to the surrounding atmosphere opens out into an intermediate activated carbon tank for control of fuel evaporation.

8. Device according to claim 6 or 7, characterised in that the two chambers (36, 37) of the valve (35) are directly connected to each other when the valve body (39) is lifted off a valve seat (38).

9. Device according to claims, 1, 2, 3, 4 or 5, characterised in that the valve (35a; 123) has a single chamber (51; 126), which on the one hand is connected by a first channel (52; 140) to at least two air inlet and outlet pipes (e.g. operating evacuation means 15, 16, 27 and 139 in FIG. 1 or 2 and FIG. 8 respectively) which start from the tank (e.g. 10 in FIG. 1 or 2) and open out into a valve housing (30a; 123), and which on the other hand comprises means controlled by the valve body (39; 127) for communication with the interior of the filler neck (11; 110), and the interior of the filler neck communicates with the surrounding atmosphere via a second channel (56; 147) of the valve housing (30a; 123), via an intermediate activated carbon tank (FIGS. 4, 5 and 8).

10. Device according to claim 1, characterised in that a roll-over valve (31 or 58) is inserted in said air inlet and outlet pipes (48, 31, 32 or 56; 147) which start from a valve housing (30, 30a; 123) and lead into the atmosphere, via an activated carbon tank.

11. Device according to claim 10, characterised in that the roll-over valve (31, 58) is attached directly to a valve housing (30 or 30a) and thus incorporated into the valve (35 or 35a).

12. Device according to claim 1, characterised in that a valve housing (30, 30a; 123), including chambers (36, 37, 51; 126) and valve seat (38; 129), is made of plastic, and constructed as a plastic injection moulded component.

13. Device according to claim 12, characterised in that said chambers (36, 37, 51; 126), plus pipe connections (45, 53, 54, 57; 139, 147), and channels (46, 48, 52, 56) and said valve seat (38; 129) are formed in the valve housing (30 or 30a; 123) by injection moulding at the same time as manufacture of the valve housing (30 or 30a; 123).

14. Device according to claim 1, wherein said filler neck is made of plastic, characterised in that a valve housing (30a; 123) is welded to the outer wall of the filler neck (11; 110) (FIGS. 4 and 8).

15. Device according to claim 10, characterised in that the roll-over valve (31, 58) and valve housing (30, 30a) are made of the same plastic material and also made by injection moulding.

16. Device according to claim 10, characterised in that the roll-over valve (58) has a sleeve-like extension (59) with which it is fitted over a connecting stud (57) of the valve housing (30a) (FIGS. 4, 6 and 7).

17. Device according to claim 15, characterised in that the roll-over valve is welded onto the valve housing.

18. Device according to claim 1, with a bayonet socket disposed at a top end of the filler neck for receiving and holding said tank cap in sealing relationship, characterised in that the bayonet socket (113) axially overlaps the end of the piston stem (128) protruding out of the filler neck (110, 112) and covers it on the outside, and in the bayonet socket (113) is rotatably mounted an end-face seal (141) which comprises in its rear face a recess (142) with an inclined surface (143) which is operatively connected to the end of the valve piston stem (128), and the end-face seal (141) can be operated by the tank cap when it is screwed onto or unscrewed from the bayonet socket (113) (FIGS. 8–10).

19. Device according to claim 18, the tank cap having spring lugs which cooperate with inclined surfaces (115) and latching recesses (116) in the bayonet socket (113), characterised in that the end-face seal (141) comprises recesses (145, 146) for engagement of the spring lugs, such that during rotation of the tank cap, it can be rotated by the latter by means of the spring lugs.

20. Device according to claim 5, characterised in that at the bend (121) between the upper end (112) and lower (111) portion of the filler neck (110), inside the latter, is formed a funnel (148, 149) which can be closed off by a spring steel flap (150) and whose upper region (wall 148) also serves as the protective wall providing a shield from the interior of the filler neck (110) which receives a petrol pump nozzle during refuelling (FIG. 8).

* * * * *